(No Model.)

W. CONNELLY.
COUPLING FOR TUBULAR SECTIONS.

No. 552,315.

Patented Dec. 31, 1895.

WITNESSES
Carl H. Keller.
Maud Schumacher.

INVENTOR
William Connelly
By William Webster
Atty

UNITED STATES PATENT OFFICE.

WILLIAM CONNELLY, OF TOLEDO, OHIO.

COUPLING FOR TUBULAR SECTIONS.

SPECIFICATION forming part of Letters Patent No. 552,315, dated December 31, 1895.

Application filed July 15, 1895. Serial No. 556,010. (No model.)

*To all whom it may concern:*

Be it known that I, WILLIAM CONNELLY, of Toledo, county of Lucas, and State of Ohio, have invented certain new and useful Improvements in Couplings for Tubular Sections; and I do hereby declare that the following is a full, clear, and exact description of the invention, which will enable others skilled in the art to which it appertains to make and use the same, reference being had to the accompanying drawings, and to the numerals of reference marked thereon, which form part of this specification.

My invention relates to a coupling for tubular sections, and has for its object to provide a coupling whereby two or more tubular sections may be coupled together in a positive manner to withstand as great or greater tensile strain at the coupling-point than the normal tensile strength of the section or sections between the couplings.

A further object is to couple two tubular sections together in such positive relation that a reciprocation of the two while under tension shall not affect the union effected by the coupling, and also that when reciprocated with tensible strain in one direction and returned, when exerting a pushing power in the opposite direction, shall hold the sections rigidly from displacement within the coupling.

A further object is to construct a coupling by which the sections may be securely held from both longitudinal and revoluble movement.

A further object is to provide a simple and inexpensive coupling for tubular sections.

The invention consists in the parts and combination of parts hereinafter described, and pointed out in the claims.

Figure 1:
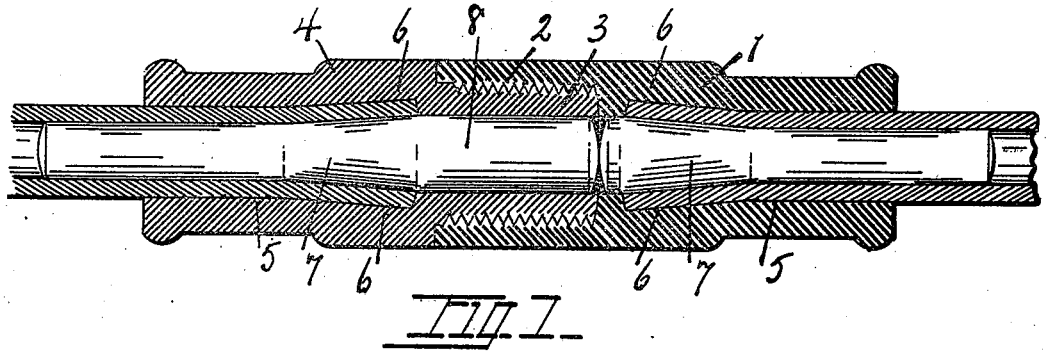
Figure 2:
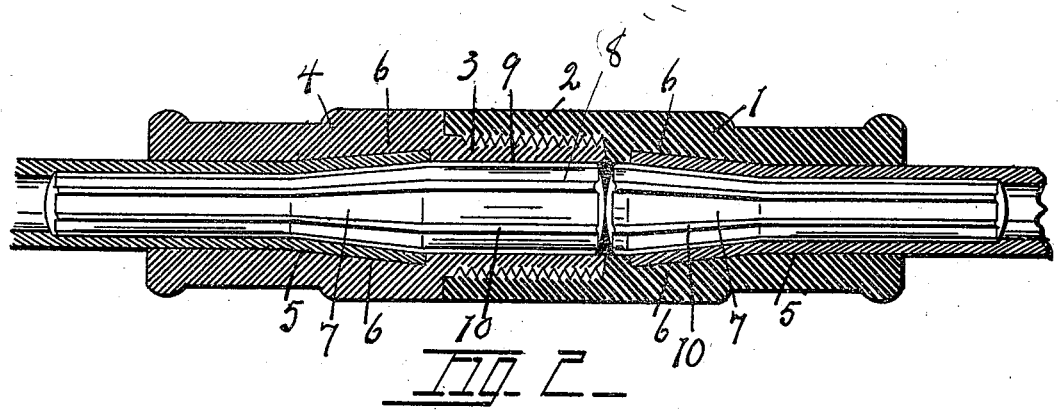
Figure 3:
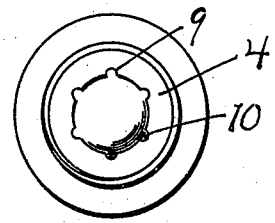

In the drawings, Figure 1 is a longitudinal vertical section showing two sections of pipe coupled with my improved coupling, the plugs being shown in full lines. Fig. 2 is a like view showing the expanding plugs and coupling-sections fluted to preclude the possibility of revoluble displacement of one section with relation to the other. Fig. 3 is an end view of the end of a section of pipe expanded within a section of the modified form of coupling shown in Fig. 2.

My invention is more especially designed for use in coupling piping for sucker-rods and rods for analogous use, and is especially desirable for coupling tubular sections where great security is important without such supplemental attachment as are likely to become detached, and consists of two sections, the section 1 having an internally-screw-threaded end 2, into which the externally-screw-threaded projecting end 3 of coupling 4 is screwed, thereby closely and firmly uniting the two sections. Each section is formed with a longitudinal central opening 5 extending entirely through the body of the section and of a diameter at each outer end to closely encircle the pipe or tube to be coupled, and from this point extending inwardly is conical for a portion, or, if desired, the entire length, the area of the diameter increasing to an extent to finally end at an increased diameter equal to, or nearly so, to that of the opening 5, with the additional thickness of the pipe added, thereby forming abutting walls 6, against which the ends of the pipe seat when coupled.

7 designates tapered plugs, of a diameter corresponding in form with that of the inclination of the openings in the sections, and of a diameter to expand the end of the pipe to closely seat the same in the conical recess when driven firmly to place, the plug intended for section 4 having an extended end 8, of a length and diameter of the screw-threaded portion of the end 3, whereby the two plugs are so closely assembled at their inner or meeting ends as to prevent displacement from any unusual strain or jar upon the coupling.

In Figs. 2 and 3 the relative relations are the same. Hence the same numerals will be employed in designating the parts, the modification consisting in forming grooves 9 in the wall of each section, and forming longitudinal ribs 10 upon the tapered plugs, whereby with the ribs 10 seated in the grooves and finally embedded in the metal of the pipe all revoluble movement is prevented. This feature is of great importance where there is a torsional strain upon the pipe-sections coupled.

It will be seen that the coupling is inexpensive and that it effects a permanent immovable joinder of the two sections of pipe without lessening the strength thereof.

While I have described the coupling as particularly adaptable to joining sections of tubular sucker-rods, it will be apparent that the range of utility is greater than this specific use.

What I claim is—

1. A coupling for tubular sections comprising two tubular attachable sections formed with inversely tapered openings, tubular sections in the openings and solid tapered plugs inversely located in the ends of the tubular sections and forced therein to a degree to expand the sections to the taper of the coupling sections, the enlarged ends of the plugs abutting against each other when the coupling sections are secured together.

2. A coupling for tubular sections comprising two attachable sections formed with inversely tapered openings to receive the ends of the tubular sections, and having longitudinal channels, and tapered plugs having longitudinal ribs to enter the channels and embed in the metal of the tubular sections.

In testimony that I claim the foregoing as my own I hereby affix my signature in presence of two witnesses.

WILLIAM CONNELLY.

Witnesses:
WILLIAM WEBSTER,
PETER J. MENTER.